Feb. 5, 1957 R. A. SCHAFER 2,780,116
ADJUSTABLE CONTROL ASSEMBLY FOR MACHINE TOOLS
Filed May 4, 1953 2 Sheets-Sheet 1

INVENTOR:
Robert A. Schafer
By Ahlberg, Wupper & Gradolph
Attorneys.

Feb. 5, 1957   R. A. SCHAFER   2,780,116
ADJUSTABLE CONTROL ASSEMBLY FOR MACHINE TOOLS
Filed May 4, 1953   2 Sheets-Sheet 2
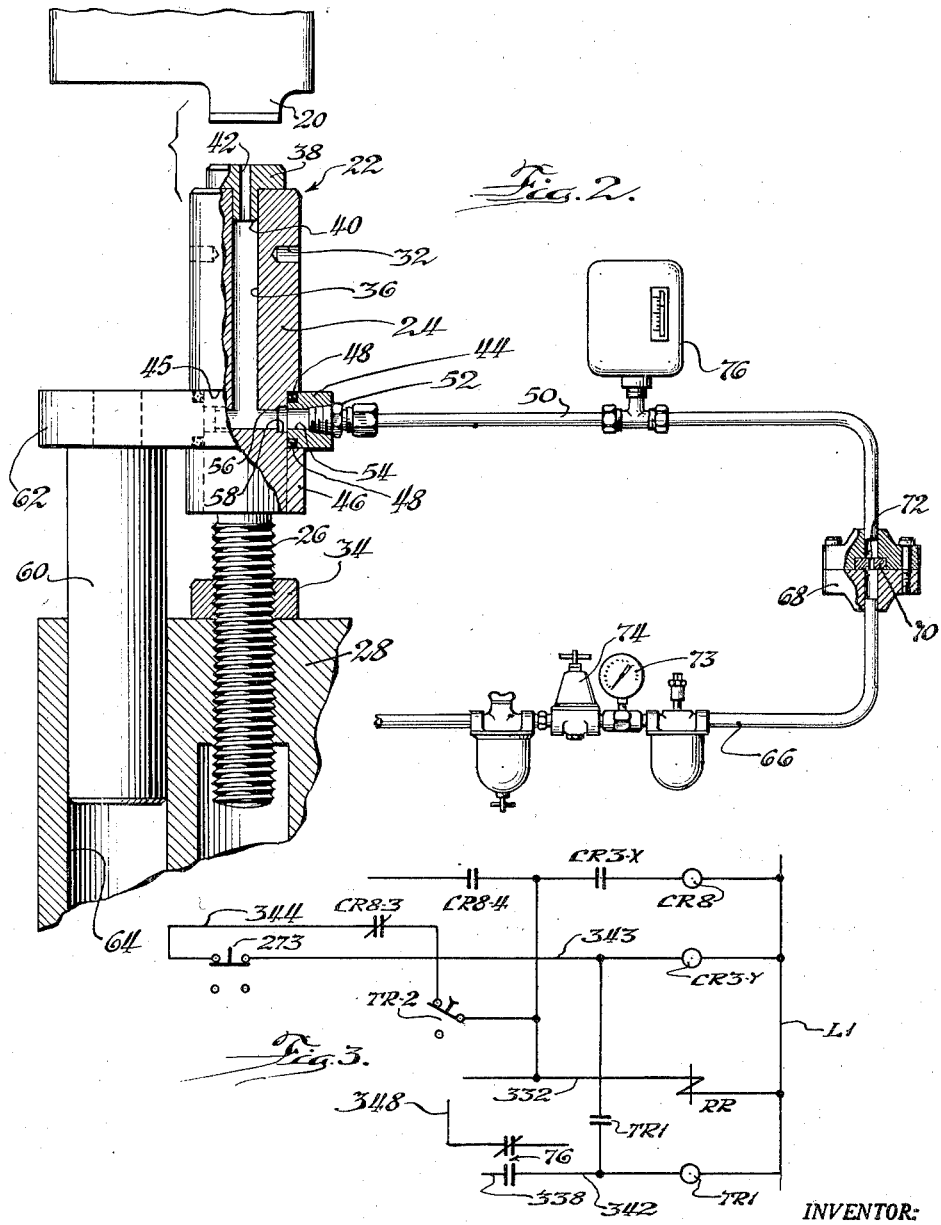
INVENTOR:
Robert A. Schafer
By Ahlberg, Wupper & Bradolph,
Attorneys.

United States Patent Office 2,780,116
Patented Feb. 5, 1957

2,780,116

ADJUSTABLE CONTROL ASSEMBLY FOR MACHINE TOOLS

Robert A. Schafer, Richmond, Ind., assignor to National Automatic Tool Company, Inc., Richmond, Ind., a corporation of Indiana Application May 4, 1953, Serial No. 352,900

10 Claims. (Cl. 77—32.5)

The present invention relates to machine tools in which a cutting tool is fed into a workpiece by the progression of a translatable member along a stationary support.

In carrying out facing, counterboring and other machining operations it is frequently desirable to clean up the cut made by terminating feeding movement of the cutting tool into the workpiece at a final depth position, which may vary for different machining operations, and continuing the machining action for a short predetermined period with the tool dwelling in final depth position. The general aim of the invention is to provide improved means for carying through the final phases of machining operations of this character.

One object of the invention is to provide for a machine tool an adjustable control assembly of simplified construction capable of positively terminating feeding movement of a cutting tool into the workpiece at a final depth position, determined by a simple adjustment of the assembly, and initiating an extended machining period synchronized with the termination of feeding movement of the cutting tool, the synchronization of the extended machining period with the termination of tool feeding movement being altogether unaffected by adjustments of the assembly to vary the final depth of cut.

A further object of the invention is to provide a machine tool control assembly of the character recited in the preceding object having a sturdy, economical construction that will operate efficiently and with certainty in the greasy, dirty environment of a machine tool.

Other objects and advantages will become apparent from the following description of the exemplary form of the invention shown in the drawings, in which:

Fig. 2 is a fragmentary and partially schematic view, with certain parts broken away for clearness in illustration, showing on an enlarged scale the adjustable control assembly for the machine; and Fig. 3 is a diagrammatic view showing a portion of the electrical control means for the machine tool of Fig. 1.

Figure 1:
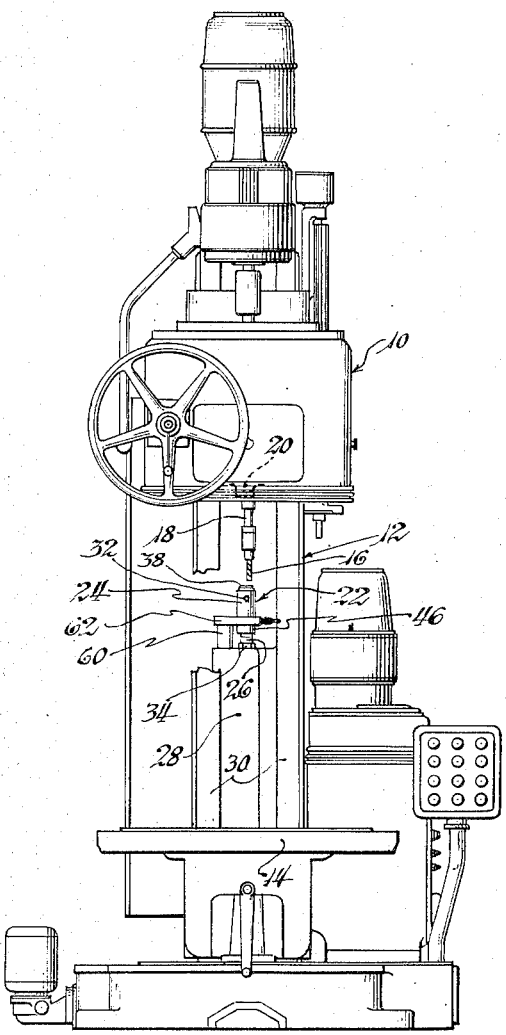
Figure 1 is a front view of a machine tool incorporating the illustrated form of the invention.

For purposes of illustration the exemplary embodiment of the invention is incorporated into the vertical drilling machine shown in Patent No. 2,483,712, issued October 4, 1949, to Robert A. Schafer. Reference may be had to this patent for a more detailed description of the machine tool structure, as such.

Briefly, the vertical drilling machine shown in Fig. 1 comprises a drilling head 10 mounted on a vertical column 12 for translation toward and away from a work support table 14 disposed below the head. A cutting tool 16 mounted in a vertical spindle 18 journaled in the head 10 is fed by downward movement of the head into a workpiece (not shown) supported on the table 14.

Feeding movement of the drilling head 10 is positively terminated at the final depth position of the cutting tool 16 by the engagement of a first abutment 20 fixed to the head with a second abutment 22 adjustably mounted on the column 12. In the preferred construction shown, the second abutment 22 comprises an upright cylindrical body 24 having a downwardly extending support stem 26 threaded into a support ledge 28 on the column 12 between a pair of guideways 30.

A number of shallow holes 32 drilled radially into the body 24 provide for convenient rotation of the latter with a spanner wrench to adjust the abutment 22 vertically, thus varying the position on the column 12 in which feeding movement of the drilling head 10 is terminated. A locknut 34 on the stem 26 is tightened against the ledge 28 to hold the abutment in adjusted position.

The abutment body 24 is centrally bored to form an upwardly open passageway 36. A disc-like anvil 38 having a cylindrical tip 40 projecting downwardly along the axis thereof is placed on the upper end of the body 24 with the tip 40 seated snugly in the passageway 36. An outlet orifice 42 from the passageway 36 is formed by an axial hole extending through the anvil 38 and its tip 42.

Air is supplied to the passageway 36 through an annular collar 44 rotatably encircling the lower end of the body 24 which is turned down to a reduced diameter. The collar 44 is held in place by an annular shoulder 45 on the body 24 and a tight band 46 encircling the body just below the collar. A pair of O-rings 48 seal opposite ends of the collar 44 to the body 24.

An air conduit 50 is connected by a coupling 52 to a radial opening 54 in the collar 44. Communication between the collar opening 54 and the passageway 36 is established through a diametrical hole 56 in the body extending through the lower end of the passageway and connecting at opposite ends with an external circumferential groove 58 in the body axially aligned with the collar opening. The structure thus formed maintains communication between the air conduit 50 and the passageway 36 for all angular positions of the abutment body 24 within the collar 44.

Upon adjustment of the abutment 22 by rotation of the body 24, the collar 44 is held against turning movement by a cylindrical guide 60 fixed at its upper end to a lateral projection 62 on the collar and depending slidably into a vertical bore 64 in the ledge 28.

Air from a pressure supply line 66 is fed into the conduit 50 and hence into the passageway 36 through a coupling 68 having an apertured disc 70 therein defining a restrictive orifice 72 in the line of flow. An air gauge 73 is connected to the supply line 66 and a control valve 74 is interposed in the line on the upstream side of the gauge to control the normal pressure on the line side of the restrictive orifice 72.

The flow area of the restrictive orifice 72 into the conduit 50 is made smaller than the flow area of the outlet orifice 42 from the passageway 36. Thus, when the orifice 42 is uncovered by separation of the first abutment 20 from the second abutment 22, the pressure within the passageway 36 drops to a level only slightly above atmospheric.

Upon progression of the drilling head 10 downwardly to the final depth position of the cutting tool, the abutment 20 carried by the head engages the adjustable abutment 22 on the support column to positively terminate feeding movement of the head and close the orifice outlet 42. This causes an immediate pressure buildup within the passageway 36 and the conduit 50.

A pressure responsive switch 76 of suitable construction is connected to the air supply conduit 50 to respond to this pressure buildup (which takes place almost simultaneously upon closure of the outlet orifice 42) to initiate an extended machining period synchronized with the engagement of the two abutments 20, 22.

The electrical control system for the illustrated drilling machine is substantially the same as that disclosed in my previously mentioned Patent No. 2,483,712. To illustrate the manner in which the pressure operated control switch 76 is integrated into this control system, a relevant portion of the control system, illustrated diagrammatically in Figs. 16 and 16A of the patent, is delineated in Fig. 3 of the present disclosure. With exceptions evident from the discussion below, the reference numerals appearing in Fig. 3 are the same as those used in the patent to designate similar components of the control.

Since the overall operation of the control system of the machine is fully disclosed in the patent, it need not be repeated here. It is sufficient to explain that the pressure operated switch 76 forming a part of the control assembly of the present invention is a double circuit switch that serves as the rapid reverse limit switch 186 connected between the conductors 338 and 342 and represented in Fig. 16A of the patent. To provide for the desired extended period of operation after closure of the switch 76 upon engagement of the abutments 20, 22, a time delay relay TR1 is connected between the conductor 342 and the line L1, as indicated in Fig. 2, to be energized upon closure of the switch 76. After the lapse of a predetermined period, the time delay relay TR1 operates to close a switch TR1 interposed between conductor 342 and conductor 343 to initiate reverse movement of the drilling head 10 as more specifically described in the patent. During the interval between the engagement of the abutments 20, 22, which operate the switch 76 and the closure of the switch TR1, the spindle 18 continues to rotate with the tool in final depth position to clean up the cut made.

It will be appreciated that since closure of the switch 76 to initiate an extended machining period is effected by the engagement of the two abutments 20, 22 with each other, adjustment of the abutment 22 to vary the final depth position of the drilling head does not disturb the synchronization of the extended machining period with the positive termination of feeding movement of the drilling head.

The positive stop and control assembly thus provided is quite simple in construction and well suited to operate with certainty and accuracy in the greasy, dirty environment of a machine tool. As a matter of fact, air issuing from the outlet orifice 42 sweeps both of the coacting abutments 20, 22 clean just before they come into positive engagement with each other, thus providing further assurance against inaccuracies in the final depth position of the drilling head 10.

While I have shown and described a preferred embodiment of my invention, it will be apparent that numerous variations and modifications thereof may be made without departing from the underlying principles and scope of the invention. I therefore desire by the following claims, to include all such variations and modifications by which substantially the results of my invention may be obtained through the use of substantially the same or equivalent means.

I claim:

1. In a machine tool having a stationary support and a translatable member thereon for feeding a cutting tool into a workpiece, control means comprising, in combination, first abutment means mounted on said stationary support, second abutment means mounted on said translatable member to terminate feeding movement of the latter by engagement with said first abutment means, means for adjusting one of said abutment means on its supporting structure toward and away from the other of said abutment means to vary the position on said stationary support in which feeding movement of said translatable member is terminated, means defining an orifice associated with one of said abutment means and closable upon mutual engagement of said abutment means, means defining an air passageway communicating with said orifice, means continuously tending to cause a flow of air through said orifice and passageway thereby to cause a change in pressure within said passageway upon closure of said orifice, and a pressure responsive control for the machine tool communicating with said passageway to be actuated as an incident to the establishment of a predetermined pressure therein.

2. In a machine tool, the combination of a stationary support, a translatable member on said support for feeding a cutting tool into a workpiece, a first abutment mounted on said stationary support, a second abutment mounted on said translatable member for engagement with said first abutment to positively terminate feeding movement of said translatable member, means for adjusting the position of one of said abutments on the support structure therefor, means defining an orifice in one of said abutments adapted to be closed by the other of said abutments upon mutual engagement of both abutments, means defining an air passageway to said orifice, means for supplying air under pressure to said passageway through a second orifice having a smaller flow area than said first mentioned orifice, and a pressure responsive control communicating with said passageway to be operated by a buildup of air pressure therein incident to a closing of said first mentioned orifice.

3. In a machine tool, the combination of a stationary support, a machining head, a rotary spindle carried by said head, said head being translatable on said support to feed a working tool on said spindle into a workpiece, a first abutment on said stationary support, a second abutment on said head adapted to engage said first abutment to terminate feeding movement of said head, means providing for adjustment of one of said abutments relative to the supporting structure therefor, means defining an orifice associated with one of said abutments to be closed upon mutual engagement of said abutments, means defining an air passageway to said orifice, means communicating with said passageway to create a pressure differential between the air therein and the atmosphere upon closing of said orifice, a pressure responsive control communicating with said passageway and operable upon the creation of a predetermined pressure therein, and time delay means for the machine providing for continued rotation of said spindle for a predetermined time subsequent to operation of said pressure responsive control.

4. In a machine tool, the combination of a stationary support, a machining head translatable on said support, first abutment means adjustably mounted on said support, second abutment means mounted on said machining head for engagement with said first abutment means to terminate feeding movement of said head, means defining an orifice in said first abutment means positioned to be closed by said second abutment means upon engagement of the latter with said first abutment means, means defining an air passageway to said orifice, means communicating with said passageway to create a pressure differential between the air therein and the atmosphere upon closure of said orifice, and pressure responsive machine tool control means communicating with said passageway to be actuated upon establishment of a predetermined pressure therein.

5. In a machine tool, the combination of a stationary support, a translatable member on said support for feeding a tool into a workpiece, a first abutment on said support, a second abutment on said translatable member for coacting with said first abutment to terminate feeding movement of said translatable member at a final depth position, one of said abutments being screw threaded into the supporting structure therefor for adjustment thereon to vary said final depth position, a longitudinal passageway defined in said adjustable abutment, means defining an outlet orifice from said passageway positioned to be closed upon mutual engagement of said two abutments, an air supply collar rotatably encircling said adjustable abutment, means for anchoring said collar against turning movement upon rotation of the abutment therein, conduit means for supplying air from a pressure source to said collar, means establishing communication between said collar and said passageway for all angular positions of said adjustable abutment, and pressure responsive switch control means communicating with said conduit to be actuated by a pressure built up therein upon closure of said orifice.

6. In a machine tool, the combination of a stationary support, a translatable member on said support for feeding a cutting tool into a workpiece, a first abutment mounted on said stationary support, a second abutment mounted on said translatable member for engagement with said first abutment to positively terminate feeding movement of said translatable member, means defining an orifice associated with one of said abutments closable upon mutual engagement of said abutments, means defining an air passageway to said orifice, means communicating with said passageway to create a pressure differential between the air therein and the atmosphere upon closure of said orifice, and a pressure responsive control for the machine tool communicating with said passageway to be actuated as an incident to the establishment of a predetermined pressure therein.

7. In a machine tool, the combination of a stationary support, a translatable drilling head mounted on said support for feeding a cutting tool into a workpiece, a first abutment mounted on said support, a second abutment mounted on said drilling head for engagement with said first abutment to positively terminate feeding movement of said drilling head, means for adjusting the position of one of said abutments on the supporting structure therefor, means defining an orifice in one of said abutments adapted to be closed by the other of said abutments upon mutual engagement of both abutments, means defining an air passageway to said orifice, means for supplying air under pressure to said passageway through a second orifice having a smaller flow area than said first mentioned orifice, a pressure responsive switch communicating with said passageway to be operated by a build-up of air pressure therein incident to a closing of said first mentioned orifice, a time relay energized upon closing of said switch, and control means operated by said time relay to terminate continued machining action of the machine tool.

8. In a machine tool, the combination of a support, a translatable feeding member on said support, a first rigid abutment on said support, a second abutment forming a component part of the machine tool rigidly mounted on said translatable feeding member and positioned for direct engagement with said first abutment to limit feeding movement of said translatable feeding member, said abutments both being sufficiently strong to terminate movement of said translatable feeding member, means for adjusting one of said abutments on the support structure therefor to vary the position at which feeding movement of said translatable feeding member is terminated, and control means for the machine tool having a movement limit sensing element on one of said abutments cooperable with a part on the other abutment upon substantially mutual engagement of said two abutments to actuate said control means to control the subsequent operation of the machine tool, whereby adjustment of said adjustable abutment simultaneously affects an adjustment of said movement limit sensing element of said control means.

9. In a machine tool, the combination of a support member, a feeding member translatable on said support member, a first abutment rigidly mounted on said support member, a second abutment forming a component part of the machine tool rigidly mounted on said feeding member for coaction with said first abutment positively to limit feeding movement of said feeding member, one of said abutments being adjustable on the member on which it is mounted so as to vary the movement of said feeding member, and machine tool control means having a movement limit sensing element mounted on one of said abutments and engageable by structure on the other abutment as an incident to termination of movement of said feeding member by mutual engagement of said two abutments to control subsequent movement of said feeding member whereby adjustment of the position of said adjustable abutment simultaneously effects an adjustment of the position of said movement limit sensing element without affecting synchronization of said machine tool control means with the mutual engagement of said abutments.

10. In a machine tool the combination of a support, a feeding member translatable on said support, a first abutment rigidly mounted on said support, a second abutment forming a component part of the machine tool rigidly mounted on said feeding member and located thereon for movement therewith directly into engagement with said first abutment to limit feeding movement of said feeding member, machine tool control means including a movement limit sensing element mounted on one of said abutments to respond to the presence of structure on the other abutment simultaneously with engagement of said abutments one with the other for actuating said control means to control subsequent operation of the machine tool, and means for adjusting one of said abutments on the support structure therefor to vary the position at which movement of said feeding member is terminated and simultaneously to effect an adjustment of the movement limit sensing element without affecting the synchronization of the control means with the mutual engagement of said abutments.

References Cited in the file of this patent

UNITED STATES PATENTS

| | | |
|---|---|---|
| 1,648,820 | Phillips | Nov. 8, 1927 |
| 2,084,562 | Schafer | June 22, 1937 |
| 2,141,465 | Grey | Dec. 27, 1938 |
| 2,625,061 | Mansfield | Jan. 13, 1953 |